Figure 1:
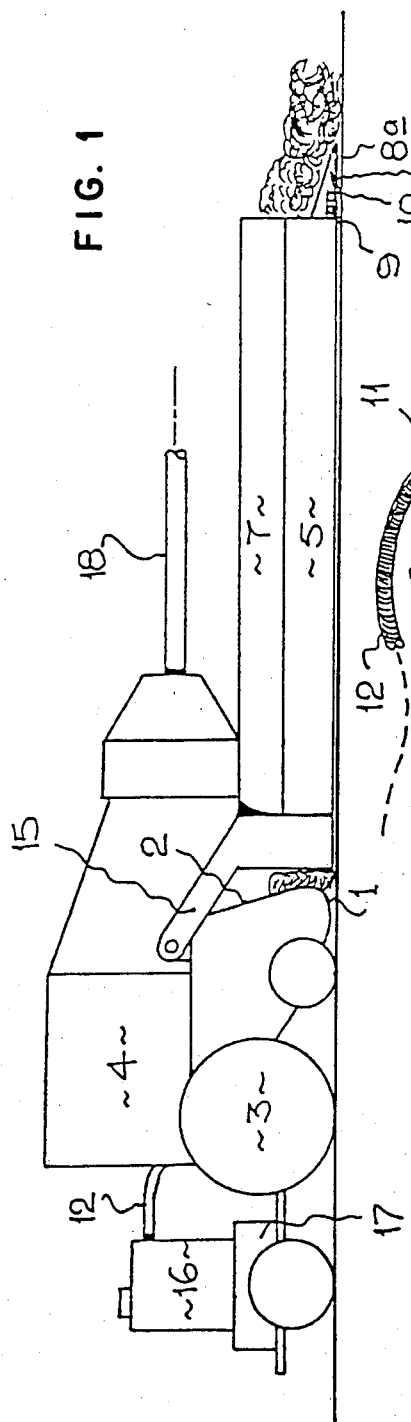

United States Patent [19]

Maher

[11] Patent Number: 4,604,857
[45] Date of Patent: Aug. 12, 1986

[54] HAY PRE-CONDITIONER

[76] Inventor: Jack Maher, 12 Williams Street, Forbes, N.S.W. 2871, Australia

[21] Appl. No.: 583,385

[22] Filed: Feb. 24, 1984

[30] Foreign Application Priority Data

Feb. 25, 1983 [AU] Australia .............................. 1243483

[51] Int. Cl.⁴ ...................... A01D 14/02; A01D 39/00
[52] U.S. Cl. ...................................... 56/16.4; 56/16.8; 56/341; 56/DIG. 5
[58] Field of Search .................. 56/1, 16.4, 16.6, 16.8, 56/341, DIG. 1, DIG. 5, DIG. 23

[56] References Cited

U.S. PATENT DOCUMENTS

| 2,466,114 | 4/1949 | Kramer | 56/16.4 |
| 3,834,141 | 9/1974 | Bracht et al. | 56/341 |
| 4,214,428 | 7/1980 | Caraway | 56/341 |
| 4,254,605 | 3/1981 | Maher et al. | 56/14.4 |

Primary Examiner—Robert P. Swiatek
Assistant Examiner—David I. Tarnoff
Attorney, Agent, or Firm—Stevens, Davis, Miller & Mosher

[57] ABSTRACT

A hay pre-conditioner mounted on a hay-baler so as to be disposed in front thereof and raisable thereto, wherein the hay pre-conditioner is comprised of an elongated, box-like structure having a plurality of transversely mounted steam outlet nozzles for conditioning a windrow of hay in front of the baler.

16 Claims, 4 Drawing Figures

U.S. Patent    Aug. 12, 1986    Sheet 1 of 3    4,604,857

HAY PRE-CONDITIONER

This invention relates to agricultural implements, and more particularly to a hay pre-conditioner of a new and much-improved kind.

Hitherto, after the mowing of a standing crop, such as lucerne for example, it has usually been the practice to leave the windrow for several days to 'cure' in the sun and wind before garnering with a hay-baler having a forwardly-mounted pick-up reel. The windrow material to be so cured is left on the ground until it has the dry appearance which results after having had its moisture content reduced to approximately 17% to 20% by weight.

The reel feeds the cured windrow material into the compressing chamber of the hay-baler where it is compressed into masses of appropriate size and weight and then tied with wire or twine to form bales, these resulting bales being allowed to fall out onto the ground at regular intervals. The bales are then picked up and taken to a suitable storage site for subsequent disposal either directly as stockfeed, or for the production of such as chaff or meal at some later date. In this connection, it will be appreciated that dew which falls on a windrow throughout the night is most essential to ensure that the material will not fracture on impact when it comes into contact with the baler mechanism. On the other hand, if a dewfall is too heavy, it may then be necessary to allow the windrow to remain for a period of one or two hours in the sun until the moisture content is once again low enough (that is, about 17% to 20% by weight) to begin the picking up and baling operation. This optimum moisture content condition, however, may well last only for a few hours. Particularly during a spell of hot 'drying' weather, overnight dewfall may be totally absent and so allow the windrow material to become over-dried before it can be garnered, with the result that the material fractures on impact and produces unsatisfactory bales liable to crumble during handling. As is all too common, little or no dew may settle on windrows for night after night in heatwave conditions, and finally a storm will seriously damage the windrowed hay—which should long have been safely garnered and stored—reducing it to low grade quality or even effectively destroying it completely.

The above and other disadvantages have been largely overcome by the provision of a hay pre-conditioner described and claimed in the specification relating to my co-pending application No. 61,915/80 but it has now been found that even further advantages may be gained—in terms of low cost, low maintenance and the like—by the provision of a hay pre-conditioner of a simplified construction and operation.

Therefore, according to the present invention, there is provided a hay pre-conditioner in association with a hay-baler, said hay pre-conditioner comprising an elongated box-like structure having opposed sidewalls and a top wall, and being adapted to be supported so as to progressively substantially enclose a portion of a windrow over which it is caused to travel; and a steam generator disposed adjacent to said hay-baler, and in communication with a plurality of steam outlet nozzles within said box-like structure, located towards the forward end thereof; whereby, as said hay pre-conditioner is caused to progress so as to traverse a windrow, the windrowed material is treated with the steam emerging from said steam outlet nozzles, and is subsequently garnered by the pick-up of said hay-baler for feeding into the feed opening thereof.

Preferably, there may be a hay pick-up means mounted forwardly of the forward end of the box-like structure, including a number of V-shaped elements spaced across the forward end so that their apices point forwardly, the lower limb of each element being disposed fractionally above the ground.

Ideally, the steam generator is mounted upon a trailer which is detachably connected to the rear end of the hay-baler.

Advantageously, the elongated box-like structure is mountable upon said hay-baler so as to be disposed in front of it and so as to be raisable relative thereto. A forwardly situated portion of the elongated box-like structure may be of a height greater than that of the remaining portion thereof, and the top wall of the forwardly situated portion may well have a feed conveyor means included therein.

Figure 3:
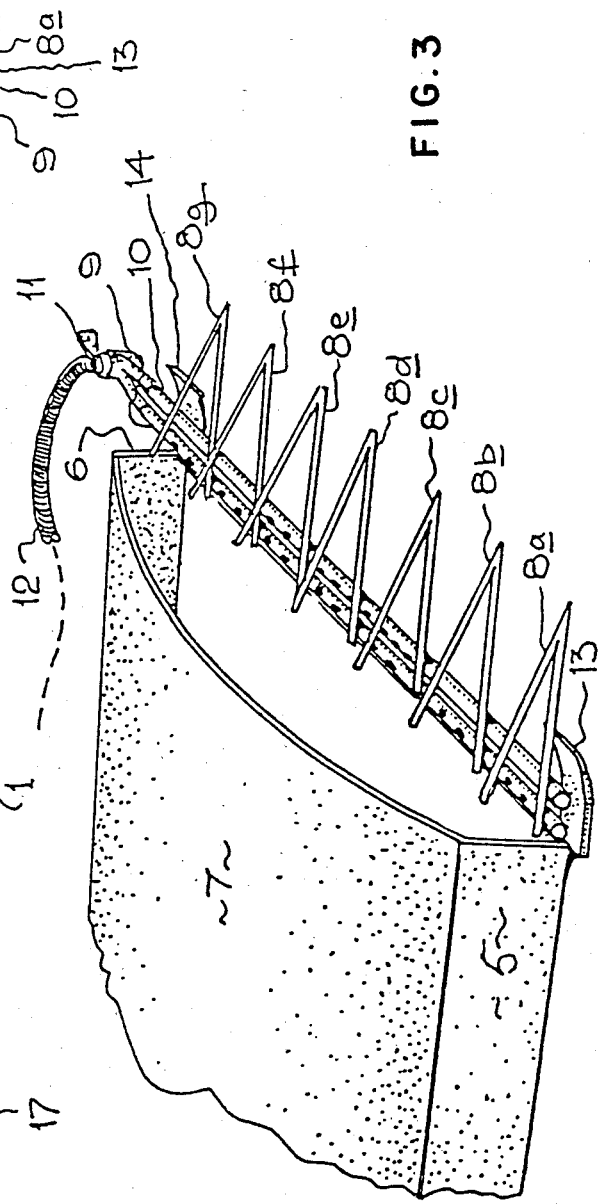
Figure 2:
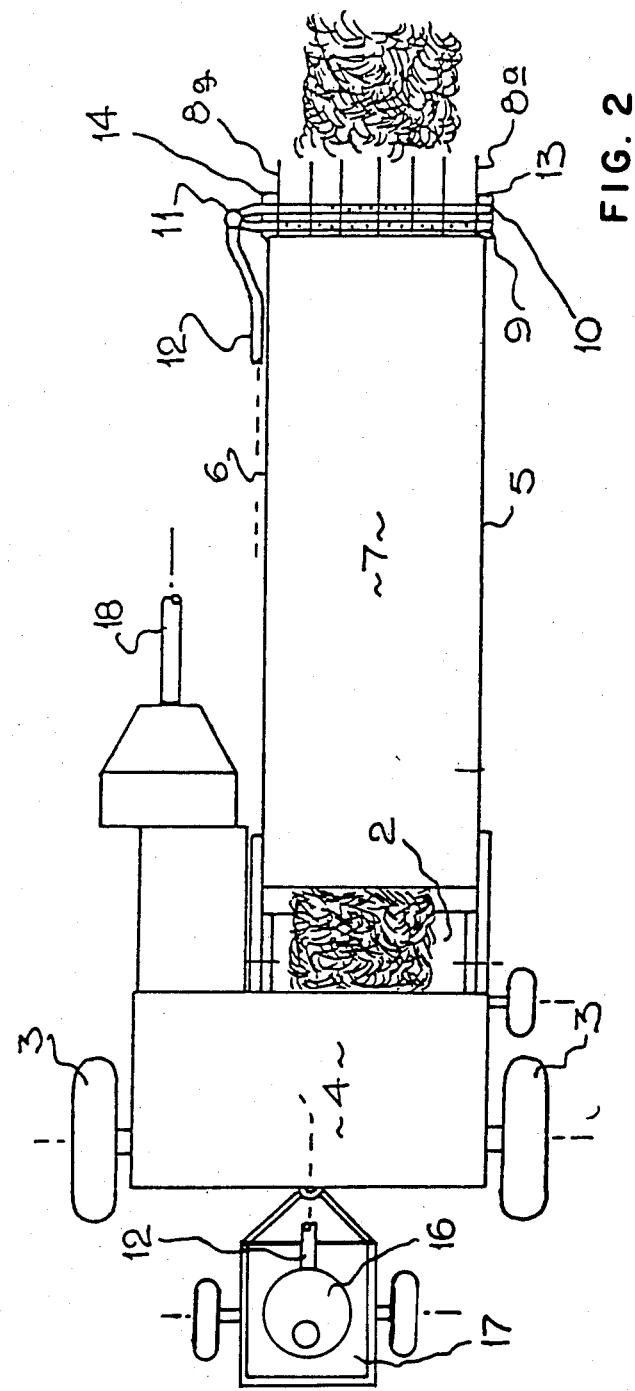
Figure 4:
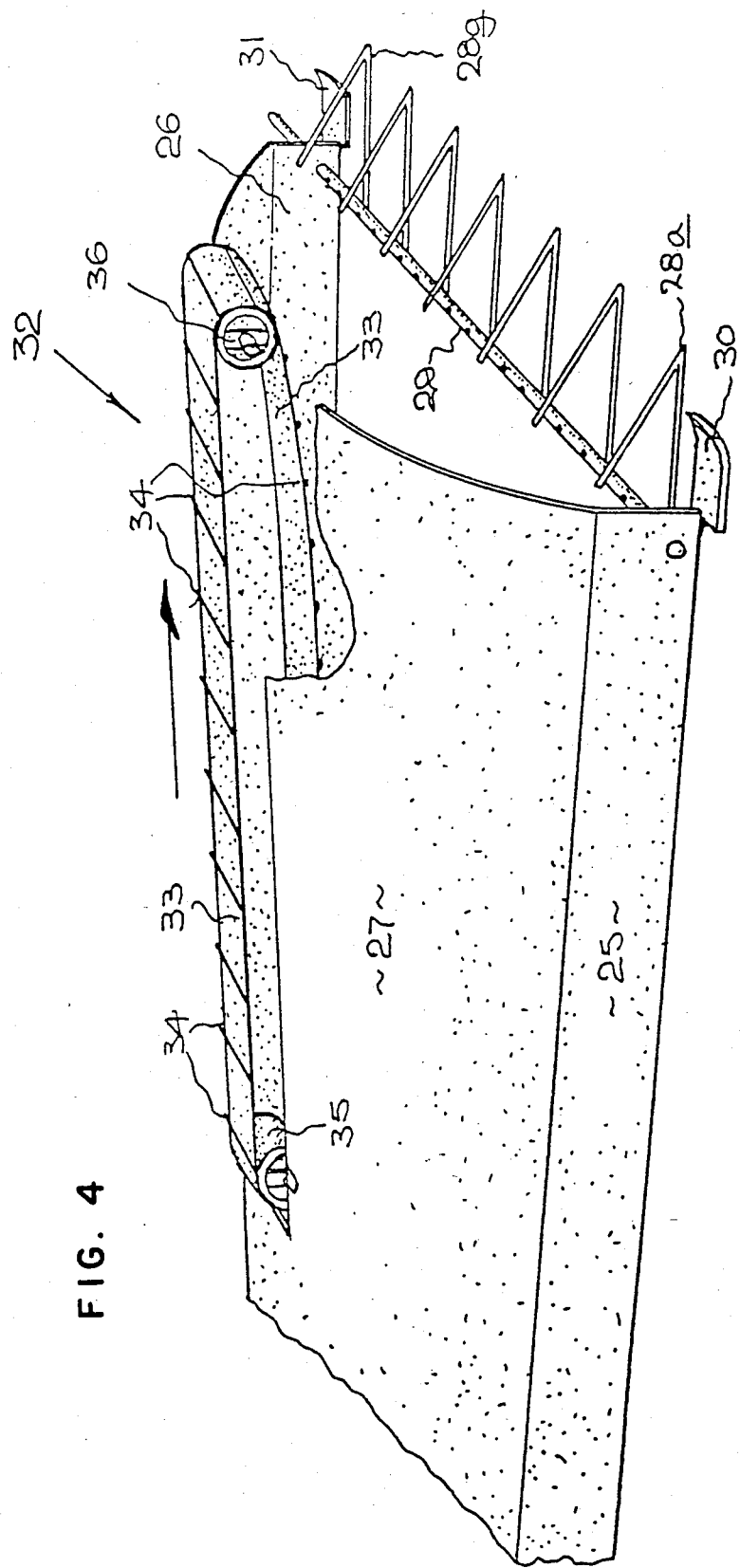

In order that the reader may gain a better understanding of the present invention, hereinafter will be described a preferred embodiment thereof, by way of example only, and with reference to the accompanying drawings in which:

FIG. 1 illustrates, somewhat schematically, a hay pre-conditioner according to the present invention, FIG. 2 is a top plan view corresponding to FIG. 1, FIG. 3 is a scrap perspective view, to an enlarged scale, showing the leading end of the hay-preconditioner, and FIG. 4 is a scrap perspective view of a second embodiment.

FIGS. 1 to 3 show a hay pre-conditioner mounted on a conventional, tractor-towed hay-baler having the usual pick-up reel 1 furnished with spring-biased rake tines, rotating within a slotted guard arrangement. Pick-up reel 1 feeds windrowed material into a feed opening 2. Such a hay-baler will generally have a pair of wheels 3 carrying the baling-chamber 4. From feed-opening 2 a tined feeder bar moves the material into the baling chamber 4 where it is compressed into bales. The baler includes either a twine-knotting or wire-twisting mechanism by means of which the compressed bales are completed before they are allowed to fall out onto the ground at regular intervals.

The hay pre-conditioner according to the present invention may comprise an elongated, box-like structure having opposed sidewalls 5 and 6 of such material as iron or steel or aluminium stock, 3 to 4 meters in length and perhaps 18 cms in height. These two sidewalls 5 and 6 may be joined by a top wall or hood 7 of part-circular cross-section so the elongated, box-like structure has a width of about 1.2 meters or, in any case, so that it is able to span the width of a windrow. At the forward end of the box-like structure there may well be hay pick-up means which may include a number of V-shaped elements 8a to 8g, each element being perhaps 30 cms long with 10 cms between the two free ends of the limbs of the V. Each element may be welded from such material as 10 mm round steel stock and there may be seven such elements, as shown, equidistantly spaced across the forward end of the box-like structure so that their apices point forwardly, the lower limb of each V being disposed fractionally above ground level.

The weight of the forward end is sufficient to ensure that the V-shaped elements skid along the ground on the skid means 13 and 14.

To the lower arms or limbs of the V-shaped elements 8a to 8g are rigidly affixed, as by welding, one or more steam manifolds constituted by lengths of 20 mm O.D. steel pipe which extend across the forward end of the box-like structure. In the accompanying drawings, two such steam manifolds 9 and 10 are shown but it will be realised that more or fewer are nevertheless contemplated. Each of the steam manifolds is provided with a plurality of steam outlet nozzles in the form of 3 mm diameter holes, and it will be noticed that manifold 9 has its holes equidistantly spaced over its whole length but that manifold 10 has its holes closer together and towards the middle. Such an arrangement ensures that windrows of different widths may be efficiently steam-treated without wastage of steam. The 'free' end or ends of the manifold are closed while at the other end is a cock 11 whereby the steam conduit 12 may be selectively connected to the chosen pipe. Steam conduit 12 is a flexible conduit, at least in part, so that it remains unaffected when rough terrain is being traversed by the pre-conditioner. This manifold is also the means whereby the set of V-shaped elements 8a to 8g are attached adjacent the forward end of the box-like structure.

Skids 13 and 14, or castors or the like, may be attached at each side of the pre-conditioner to prevent its 'nosing' into the ground and so ensure smoother progression.

Under certain conditions, a modification of the forward end of the pre-conditioner may be found to be more efficient; in such a modification the V-shaped elements are dispensed with, and the steam manifold itself acts as a hay pick-up means, sliding beneath the windrowed material as the pre-conditioner is moved forward. In such a modification the V-shaped elements may be arranged so as to be readily detachable from the steam manifold or, alternatively, the manifold and V-shaped elements affixed thereto detached from the skids, to be replaced by a steam manifold not provided with V-shaped elements.

Provision is made to enable the pre-conditioner to be mounted on a suitable part of the bodywork or casing of the hay-baler. As will be appreciated, this mounting means may be engineered in various ways having regard to the fact that the pre-conditioner should be readily and easily detachable (as by the simple removal of pins, for example) to enable the hay-baler to function normally, that is to say, without the pre-conditioner, when baling conditions are optimum.

Such disassembly has been found to be quite manageable by a sole operator in the following way: the steam generator, on a trailer for preference, is firstly unhitched from the hay-baler and the tractor with the attached hay-baler is driven forward, clear of the steam unit, say 10 to 12 meters. The pre-conditioner is then detached and the tractor is reversed clear of the pre-conditioner. The tractor may now be driven forward, around the detached pre-conditioner, and the hay-baler used as designed. Reassembly may be accomplished by reversing the above sequence of movements.

It is desirable that the pre-conditioner should be able to be raised relative to the hay-baler for travel over rough terrain and the like, so that the box-like structure will require to be pivotally mountable on the casing of the hay-baler. FIG. 1 shows one example of such a mounting, which includes a pair of cantilever arms such as 15. The raising and lowering of the pre-conditioner relative to the hay-baler may be brought about by conventional means such as a hydraulic arrangement under the control of the operator of the hay-baler, or by electrically-operated linear actuators or even manually when the equipment is small and of slight weight. As will be appreciated, the pre-conditioner will be mountable on the hay baler so that the longitudinal axis of the box-like structure is in register with the centre line of the feed opening of the hay-baler.

The steam generator 16, of conventional kind, is mounted on a trailer, preferably a two-wheeled trailer 17, detachably connected to the rear end of the hay baler for rapid disassembly therefrom. The trailing position of the trailer is immaterial but should be such that it does not interfere with discharge of the bales from the baling chamber 4. Steam generator 16 may be adapted for operation from a tractor cab and is in communication, via a steam conduit 12 such as a flexible hose, with the apertured manifold 9, 10; for optimum steam penetration, the steam outlet nozzles should be angled away from the vertical.

The preferred mode of operation of the hay pre-conditioner according to the above-described embodiments of the present invention is as follows: as the hay-baler is towed along so as to traverse a windrow, the V-shaped elements of the pick-up means lift the windrowed material from the ground, the material being pushed back up the upper limbs of the V-shaped elements and at the same time being steamed by jets of steam from the manifold. In the modification also previously described, the windrowed material is both lifted and steamed by the manifold. In either case, the steamed windrow material falls back onto the ground to re-form the windrow which, from that point up to the time that it is picked up by the pick-up reel of the hay-baler, is covered by the box-like structure of the pre-conditioner. The mechanisms of the hay-baler are driven by shaft 18 which is universally coupled to the power take-off shaft of the towing tractor. While the box-like structure should be as short as possible to enhance manoeuvrability, it should nevertheless be long enough to properly pre-condition hay in its passage thereover. In practice, a length of the order of 3 to 4 meters will be found to be suitable. To aid the travel of the windrow material from the pick-up means, a feed roller arrangement may well be incorporated in the elongated, box-like structure.

FIG. 4 shows a second embodiment of the present invention which has particular application in windy or blustery conditions. Under such conditions, windrow material tends to become 'teased' or 'fluffed out' to such an extent that the box-like structure 5, 6 and 7 shown in FIGS. 1 to 3 is too close to the ground to clear the windrow.

Thus, FIG. 4 depicts an elongated box-like structure having opposed sidewalls 25 and 26 of such a material as iron or steel or aluminium stock, 3 to 4 meters in length and perhaps 18 cms in height. These two sidewalls 25 and 26 are joined by a top wall or hood 27 of varying part-circular cross-section so that the elongated box-like structure has a width of about 1.2 meters or, in any case, so that it is able to span the width of a windrow. Hood 27 is configured so as to be perhaps 40 to 50 cms above the ground, at its highest point, at the leading end reducing to, say, 28 cms at a point 130 cms back from the leading end. From this point to the trailing end of the structure the top of hood 27 is parallel to sidewalls 25 and 26.

As in the previously-described embodiment, the forward end may be furnished with V-shaped elements 28a to 28g and one or more steam manifolds, such as 29. Skids 30 and 31, or castors or the like, are provided as before.

Included in the construction of the top wall 27 of the higher, forwardly situated portion may be a feed conveyor means, generally referenced 32. Tbhis may well take the form of an endless belt 33, having transverse battens 34, travelling about rollers or pulleys 35 and 36 journalled in the top of the hood, the width of the belt being perhaps in the order of 10 cms. The function of this feed conveyor is to prevent windrow material from being 'bulldozed' by the pick-up and to draw it over the steam manifold 29. After the steaming, the now-limper hay is deposited back onto the ground and formed into a windrow more compact than it was before being conditioned.

A 'bonus' advantage lies in the fact that, after the steaming of windrow material, not a living creature is to be found in the resulting bales; thus the dangerous spread of such intruders as insect pests is prevented.

A further advantage is that, after a desired bale weight has been arrived at, the actual weight per bale varies very little, hour after hour. This is desirable since in recent years selling per bale has become the norm, and thus it will be appreciated that erratic or 'catch weight' bales may well result in loss to either the vendor or the purchaser.

As has been previously stated herein, in many regions of Australia, for example, the optimum moisture content condition may well last for only a few hours each morning. With the presently-described hay pre-conditioner, when the dew is on the windrows, the hay-baler is used alone in the designed manner. However, when the windrowed material becomes over-dried as the day wears on and when the operation of a hay-baler alone would have to be discontinued, the hay pre-conditioner is brought into play and operates to pre-condition the windrowed material so that baling can be continued throughout the day.

As an example of the above, the following actual case may be cited: In tests leading to the invention, a paddock of windrowed lucerne hay was visually inspected at 7.00 am on a particular day, in the usual way. This inspection showed that the moisture content was obviously too high and the stems too 'sappy'. Now, according to the conventional procedure, the paddock would be given a further visual inspection at 7.00 am on the following day.

However, inspection at 11.30 am on the same day clearly indicated the moisture content of the stems to be satisfactory but the leaves to be overdry. They 'fractured on impact' when walked upon. A hay pre-conditioner according to the present invention was then put into use, and steaming and subsequent baling was commenced. Thus, a time saving of over 19 hours was effected!

It is considered that the present invention will offer to the harvesting contractor or the farmer a useful alternative to the prior known hay pre-conditioning implements and, moreover, as the present invention is an adjunct to an existing hay-baler, it may be of a lighter construction than is customary. This factor, together with the opportunity afforded for dispensing with moving parts, results in a corresponding lower capital cost to the buyer.

There again, as it is envisaged that the present hay pre-conditioner will be easily attachable to, and detachable from, a hay-baler, it is a most suitable implement to be shared between several hay-growers, to their mutual financial advantage.

I claim:

1. A hay pre-conditioner in association with a hay-baler having a pick-up, said hay pre-conditioner comprising an elongated box-like structure having opposed sidewalls and a top wall, and being adapted to be supported so as to progressively substantially enclose a portion of a windrow over which it is caused to travel; means mounting the box-like structure to the hay-baler so as to be raisable relative thereto; and a steam generator disposed adjacent to said hay-baler, and in communication with a plurality of steam outlet nozzles within said box-like structure, located towards the forward end thereof; whereby, as said hay pre-conditioner is caused to progress so as to traverse a windrow, the windrowed material is treated with steam emerging from said steam outlet nozzles, and is subsequently garnered by the pick-up of said hay-baler for feeding into a feed opening thereof.

2. The hay pre-conditioner as claimed in claim 1, wherein said elongated, box-like structure is mountable so as to be disposed in front of said hay-baler.

3. A hay pre-conditioner in association with a hay-baler having a pick-up, said hay pre-conditioner comprising an elongated box-like structure having opposed sidewalls and a top wall, and being adapfted to be supported so as to progressively substantially enclose a portion of a windrow over which it is caused to travel; hay pick-up means mounted forwardly of the forward end of said box-like structure; means mounting the box-like structure to the hay-baler so as to be raisable relative thereto; and a steam generator disposed adjacent to said hay-baler and in communication with a plurality of steam outlet nozzles within said box-like structure, located toward the forward end thereof; whereby, as said hay pre-conditioner is caused to progress so as to traverse a windrow, hay picked up by said hay pick-up means is treated with steam emerging from said steam outlet nozzles, and is deposited on the ground beneath said box-like structure and is subsequently garnered by the pick-up of said hay-baler for feeding into a feed opening thereof.

4. The hay pre-conditioner as claimed in claim 3, wherein said elongated, box-like structure is mountable so as to be disposed in front of said hay-baler.

5. The hay pre-conditioner as claimed in claim 3, wherein said hay pick-up means includes a number of V-shaped elements spaced across said forward end so that their apices point forwardly, a lower limb of each element being disposed fractionally above the ground.

6. The hay pre-conditioner as claimed in claim 1, wherein said plurality of steam outlet nozzles is constituted by apertures formed in at least one steam manifold disposed adjacent to the said forward end.

7. The hay pre-conditioner as claimed in claim 6, wherein said plurality of steam outlet nozzles is constituted by said apertures being formed in a said at least one steam manifold extending transversely across said forward end.

8. The hay pre-conditioner as claimed in claim 3, wherein said plurality of steam outlet nozzles is constituted by apertures formed in at least one steam manifold disposed adjacent to the said forward end.

9. The hay pre-conditioner as claimed in claim 8, wherein said plurality of steam outlet nozzles is constituted by said apertures being formed in a said at least one steam manifold extending transversely across said forward end.

10. The hay pre-conditioner as claimed in claim 1, wherein said steam generator is mounted upon a trailer which is detachably connected to the rear end of said hay-baler.

11. The hay pre-conditioner as claimed in claim 3, wherein said steam generator is mounted upon a trailer which is detachably connected to the rear end of said hay-baler.

12. The hay pre-conditioner as claimed in claim 1, wherein a forwardly-situated portion of said elongated box-like structure is of a height greater than that of the remaining portion thereof, and incorporates a feed conveyor means.

13. The hay pre-conditioner as claimed in claim 3, wherein a forwardly-situated portion of said elongated box-like structure is of a height greater than that of the remaining portion thereof, and incorporates a feed conveyor means.

14. A hay pre-conditioner mounted on a hay-baler having a pick-up so as to be raisable relative thereto, said hay pre-conditioner comprising an elongated, box-like structure having a forwardly-situated portion thereof of a height greater than that of the remaining portion thereof and incorporating therein a feed conveyor means; said structure having opposed sidewalls and a top wall and being adapted to be supported so as to progressively substantially enclose a portion of a windrow over which it is caused to travel; and a steam generator disposed adjacent to said hay-baler and in communication with a plurality of steam outlet nozzles within said base-like structure, located adjacent to the forward end thereof, said plurality of steam outlet nozzles being constituted by apertures formed in at least one steam manifold disposed adjacent to the said forward end, said steam generator being mounted upon a trailer detachably connectable to said hay-baler; whereby, as said hay pre-conditioner is caused to progress so as to traverse a windrow, the windrowed material is treated with steam emerging from said steam outlet nozzles, and is subsequently garnered by the pick-up of said hay-baler for feeding into a feed opening thereof.

15. The hay pre-conditioner as claimed in claim 14, wherein said elongated box-like structure is mountable so as to be disposed in front of said hay-baler.

16. A hay pre-conditioner mounted on a hay-baler having a pick-up so as to be disposed in front thereof and raisable relative thereto, said hay pre-conditioner comprising an elongated, box-like structure having opposed sidewalls and a top wall, and having a forwardly-situated portion thereof incorporating a feed conveyor means, said hay pre-conditioner further being adapted to be supported upon said hay-baler so as to progressively substantially enclose a portion of a windrow over which it is caused to travel; hay pick-up means mounted forwardly of the forward end of said box-like structure, said hay pick-up means including a number of V-shaped elements spaced across said forward end so that their apices point forwardly, a lower limb of each said element being disposed fractionally above the ground; and a steam generator mounted upon a trailer detachably connected to the rear end of said hay-baler, said steam generator being in communication with a plurality of steam outlet nozzles within said box-like structure, said plurality of nozzles being constituted by apertures formed in at least one steam manifold extending transversely across said forward end; whereby, as said hay pre-conditioner is caused to progress so as to traverse a windrow, hay picked up by said hay pick-up means is treated with steam emerging from said steam outlet nozzles and is deposited on the ground beneath said elongated box-like structure and is subsequently garnered by a pick-up of said hay-baler for feeding into the feed opening thereof.

* * * * *